United States Patent
Kelsey et al.

(10) Patent No.: US 6,796,343 B2
(45) Date of Patent: Sep. 28, 2004

(54) FLUID DISPENSING AND MEASURING SYSTEMS

(75) Inventors: Stephen Frederick Kelsey, Guildford (GB); John Madoc Kelso, London (GB); Gerard Michael O'Brien, London (GB)

(73) Assignee: Syngenta Limited (GB)

( * ) Notice: Subject to any disclaimer, the term of this patent is extended or adjusted under 35 U.S.C. 154(b) by 0 days.

(21) Appl. No.: 10/475,635

(22) PCT Filed: Apr. 17, 2002

(86) PCT No.: PCT/GB02/01779

§ 371 (c)(1), (2), (4) Date: Oct. 20, 2003

(87) PCT Pub. No.: WO02/086428

PCT Pub. Date: Oct. 31, 2002

(65) Prior Publication Data

US 2004/0112462 A1 Jun. 17, 2004

(30) Foreign Application Priority Data

Apr. 20, 2001 (GB) .............................................. 0109861

(51) Int. Cl.[7] .............................. B65B 1/04; B65B 3/00
(52) U.S. Cl. ........................ 141/354; 141/381; 222/447; 222/449; 222/450; 222/484
(58) Field of Search ................................. 141/354, 380, 141/381; 222/447, 449, 450, 484, 487

(56) References Cited

U.S. PATENT DOCUMENTS

| | | | |
|---|---|---|---|
| 2,808,966 A | * 10/1957 | Hall et al. | .................. 222/207 |
| 4,376,495 A | * 3/1983 | Spatz | ........................... 222/46 |
| 4,830,226 A | * 5/1989 | Kong | .......................... 222/205 |
| 5,937,920 A | 8/1999 | Simmel et al. | |
| 5,960,840 A | 10/1999 | Simmel et al. | |
| 6,196,522 B1 | 3/2001 | Yuen et al. | |
| 6,330,960 B1 | * 12/2001 | Faughey et al. | ............. 222/205 |
| 6,675,845 B2 | * 1/2004 | Volpenheim et al. | ....... 141/380 |

FOREIGN PATENT DOCUMENTS

| | | |
|---|---|---|
| DE | 531658 | 8/1931 |
| DE | 4021790 | 1/1992 |
| GB | 1273735 | 5/1972 |

* cited by examiner

Primary Examiner—Gregory L. Huson
Assistant Examiner—Khoa D. Huynh
(74) Attorney, Agent, or Firm—Rose M. Allen

(57) ABSTRACT

A shuttle container (2) is used in conjunction with a dispenser (22) to receive a metered dose of a liquid from a reservoir (26). The dispenser (22) includes a metering chamber which is filled and emptied by a pair of valves (43 and 58) operated by a common shaft (40). The shuttle container (2) has a locating sleeve (12) which engages with a locating slot (36) in the dispenser (22) to axially align the shuttle container (2) with the dispenser. The shuttle (2) carries a spigot (14) engage the shaft (40) to effect a discharge of liquid into the shuttle container (2). The collar (6) of the shuttle container (2) has a pair of dogs (8) which engage respective slots (38) in the outer circumference of the dispenser (22). Before the dogs (8) can engage the slots (38), the profiled end of the spigot (14) must engage a matingly profiled recess in the shaft (40). Before the shaft (40) can be displaced, it must be rotated to move a projection (52) on the shaft out of alignment with an abutment (50). The slots (38) guide the dogs (8) to achieve, the required angular and axial displacement of the shaft (40) to release it from the locking action of the abutment (50) then displace it to operate the valves (43 and 58) to effect the dispensing of the metered dose into the shuttle container (2).

8 Claims, 8 Drawing Sheets

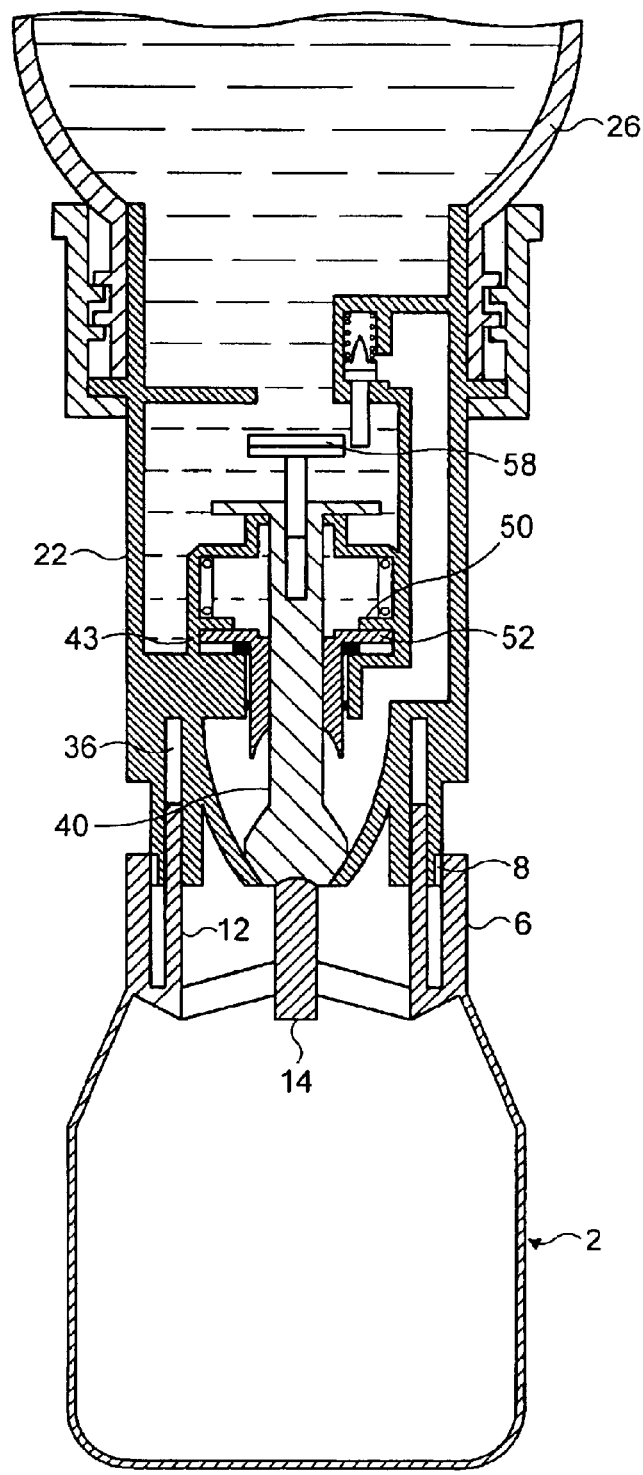
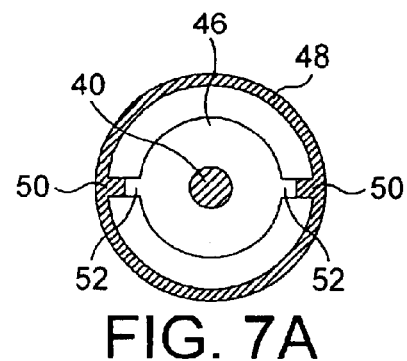
FIG. 7A
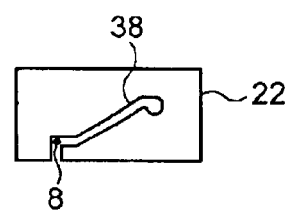
FIG. 7B
FIG. 7

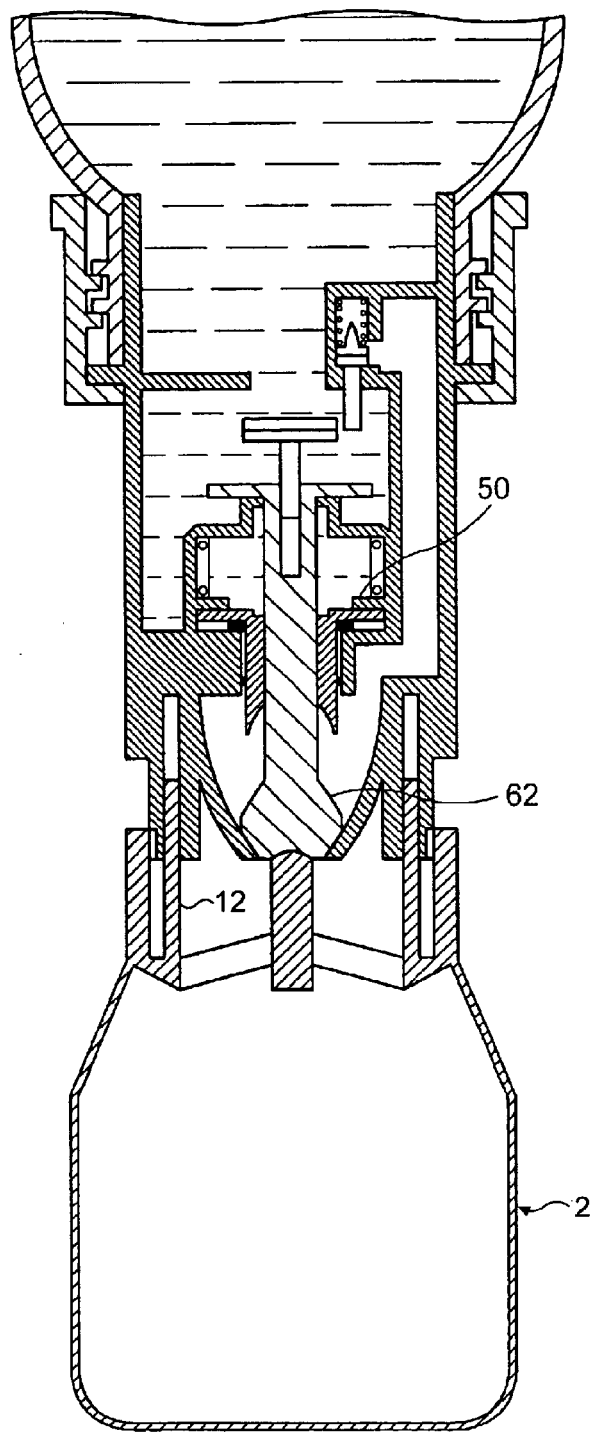
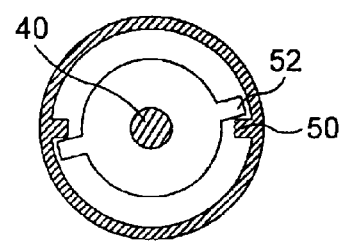
FIG. 8A
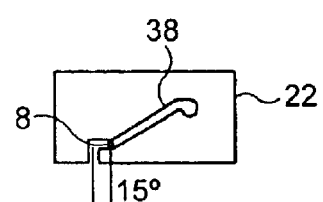
FIG. 8B
FIG. 8

FLUID DISPENSING AND MEASURING SYSTEMS

This application is a 371 of International Application No. PCT/GB02/01779 filed Apr. 17, 2002, which claims priority to GB 0109861.5, filed Apr. 20, 2001, the contents of which are incorporated herein by reference.

The present invention relates to fluid dispensing systems.

In the agrochemical field, chemicals are supplied in bulk and in concentrated form. However, for the smaller consumer, such bulk supplies are often too expensive and quite difficult to store safety. Accordingly, there is a need to enable the smaller user to obtain a single dose of the chemical in an economic and safe manner. For this purpose, it is proposed to supply the or each consumer with a refillable smaller container, capable of storing a single dose of chemical, either in liquid or powder format, which container is specific to a particular chemical and to supply each retailer with a dispenser which can safely dispense the selected chemical to the chemical specific small container only.

The small container will hereinafter be referred to as a "shuttle" since it is shuttled between the retailer and the point of use. At the point of use, the single dose of chemical is dispensed diluted and distributed over the area to be treated. The consumer has thus paid only for the dose he has consumed and has no significant residue which he must store or safeguard, thus ensuring minimum cash flow and safety.

According to the present invention there is provided a fluid dispensing system comprising a dispenser attachable to a fluid reservoir to dispense metered quantities of fluid therefrom and a shuttle container which can be coupled to the dispenser to receive a metered quantity of fluid therefrom, the dispenser including a body defining a metering chamber having an inlet and an outlet, a valve assembly comprising an elongate slide carrying a first valve for opening and closing said outlet and a second valve for opening and closing said inlet, one said valve being resiliently retractable relative to the slide so that when the slide is longitudinally displaced from a first position to a second position, the first valve closes said inlet before the second valve opens said outlet and when the slide is longitudinally displaced from the second position to the first the second valve closes said outlet before the first valve opens said inlet, the shuttle container having a collar for engagement with the body of the dispenser and a spigot for engaging the elongate slide to displace said slide from the first position to the second position, one of the engaging ends of the spigot and slide having a drive recess and the other having a mating projection which when engaged in said recess locks the two against relative rotation locking means for inhibiting displacement of the slide from the first position to the second position when the slide is in a first angular orientation and allowing said displacement when the slide is in a second angular orientation, cooperating means on said dispenser body and said collar which can engage each other only when said mating projection engages said non-circular recess, said cooperating means when engaged constraining relative movement between said shuttle container and the dispenser so as first to allow the spigot to rotate said slide from the first angular orientation to the second angular orientation to release said locking means and thereafter displace the slide from the first position to the second position both in response to manipulation of the shuttle container relative to the dispenser, whereby to discharge the metered quantity of fluid from the dispenser into the shuttle container.

A fluid dispensing system, embodying the present invention, will now be described, by way of example, with reference to the accompanying diagrammatic drawings, in which:

FIG. 7 is a longitudinal section through the shuttle and the dispenser during the first stage of engagement;

FIGS. 7A and 7B are details illustrating the relative positions of the components of the anti-lift lock and the slotted guide during the first stage of FIG. 7;

FIG. 8 is a longitudinal section through the dispenser system of FIG. 7 during a second stage of engagement;

FIGS. 8A and 8B illustrate the positions of the anti-lift lock and the guide respectively during the second stage of engagement;

Figure 1:
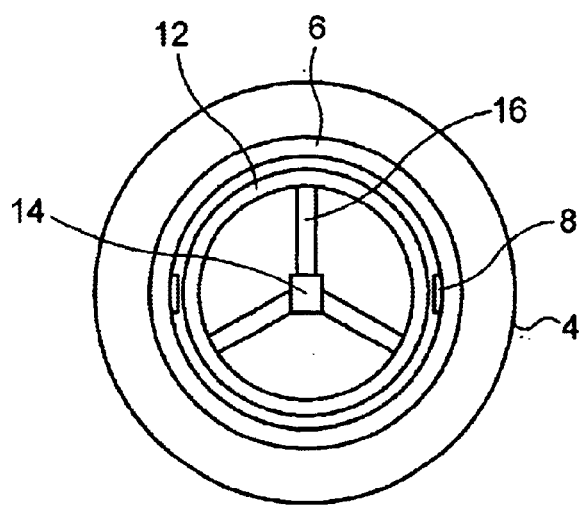
FIG. 1 is a plan view of a shuttle of the dispensing system.
Figure 2:
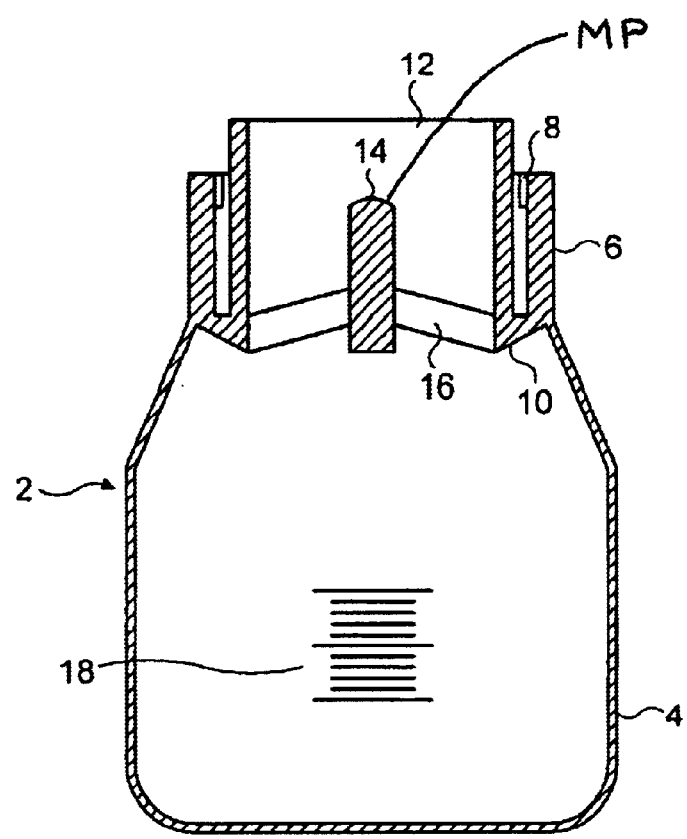
FIG. 2 is a longitudinal section through the shuttle of FIG. 1.

As shown in FIG. 2, the shuttle 2 comprises a cylindrical body 4 with an annular wide neck portion 6. At its upper end, the neck portion 6 carries first means for cooperating which includes a pair of diametrically opposite radially inwardly directed projections or dogs 8 for engaging corresponding guide slots in a dispenser to be described in more detail hereinafter. At its lower end, the neck portion 6 carries on its inner face an inwardly directed annular flange 10. The flange 10 in turn carries around its inner circumference a locating guide cylinder 12 which projects through the neck portion 6 to stand proud of the open upper end of the neck portion 6.

An axially extending elongate spigot or key 14, having a mating projection MP, is supported coaxially of both the neck portion 6 and the guide cylinder 12 by three equiangularly spaced bracing elements 16 which extend radially inwardly from the guide cylinder 12. The three bracing elements 16 are slightly upwardly inclined towards the mouth of the shuttle 2 to resist any axial displacement of the key 14 inwardly of the shuttle 2. The shuttle 2 is preferably of transparent plastics and is provided with external graduations 18 so that the volume of the contents can be readily ascertained. A closure (not shown) may be provided to screwthreadedly engage an external screwthread on the neck portion 6 to seal the contents within the container. Alternatively, any other suitable closure may be used.

The key 14 has at least at its distal end portion a specific non-circular cross-section (eg square, triangle, some other polygon) to mate with a specific dispenser as will be described in more detail hereinafter.

Figure 3:
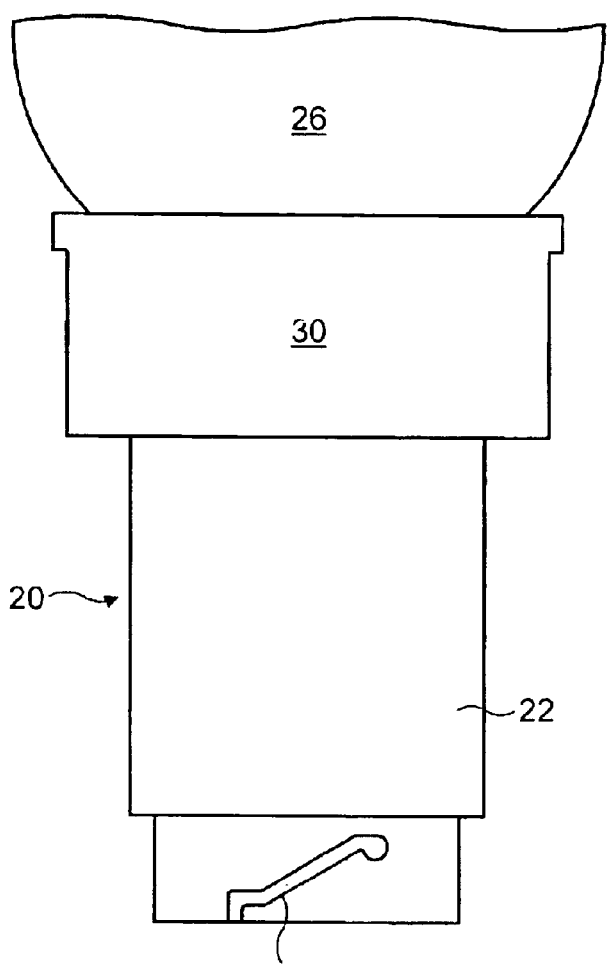
FIG. 3 is front elevation of a dispenser mounted on the neck of a bulk storage container.
Figure 4:
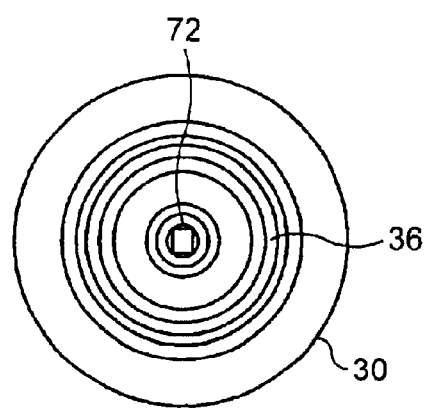
FIG. 4 is an underplan view of the dispenser of FIG. 3.
Figures 5, 6:
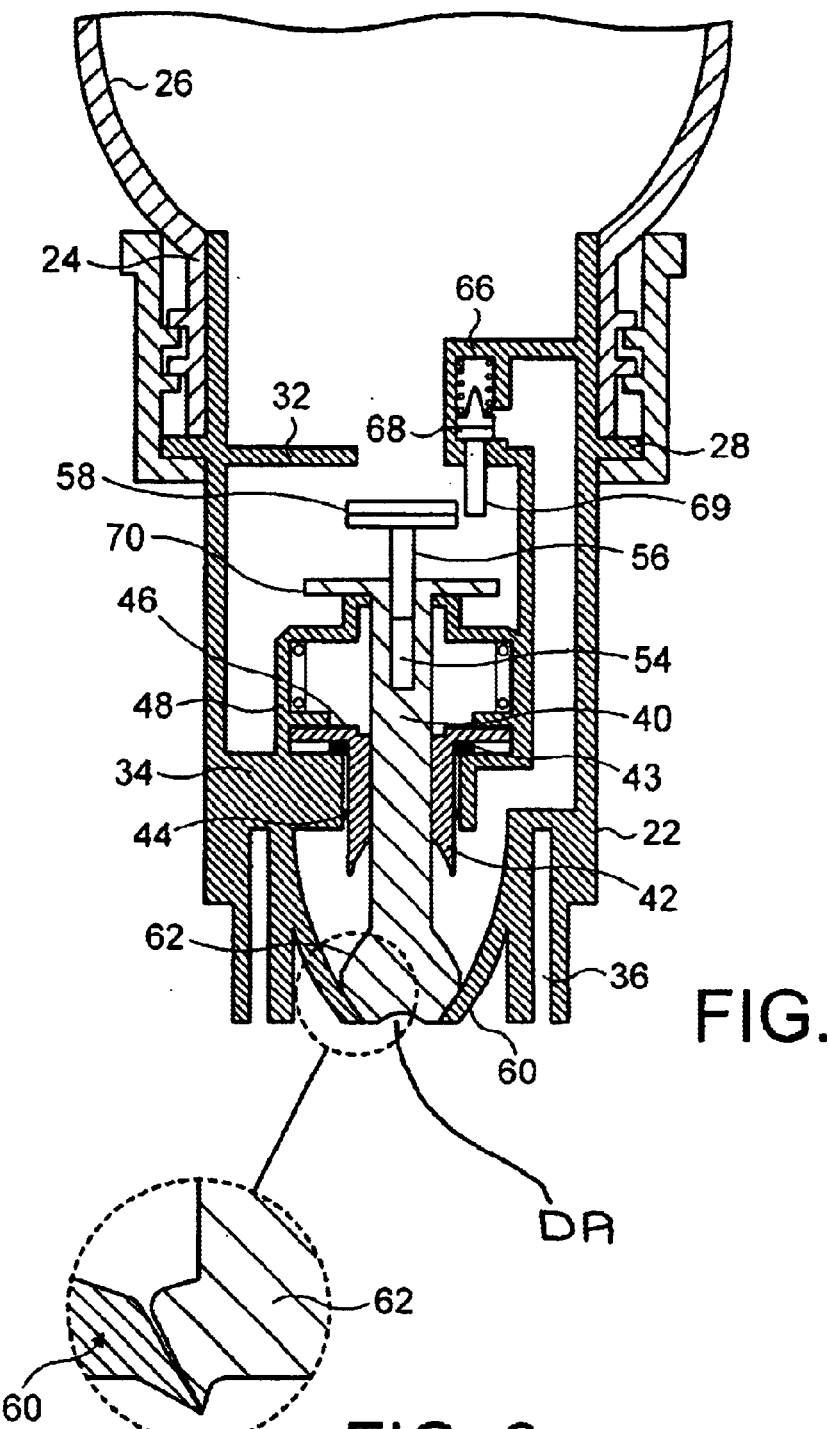
FIG. 5 is a longitudinal section through the dispenser of FIG. 4.
FIG. 6 is a detail to an enlarged scale of the dispenser of FIG. 5.

The dispenser 20, which is more clearly shown in FIGS. 3 to 5, comprises a cylindrical body 22 having an upper end which is arranged to snugly slide into the neck 24 of an inverted bulk liquid concentrate container 26. The body 22 has a radially outwardly extending annular flange 28 to limit the extent to which the body 22 can slide into the neck 24. A locking cap 30, which can screwthreadedly engage an external screwthread in the neck 24, acts to urge the flange 28 against the lower periphery of the neck to lock the dispenser 20 to the container 26. A seal (not shown) may be provided between the flange 28 and the neck 24 and/or between the neck 24 and the body 22 to produce a liquid-tight seal between the body 22 and the container 26. The body 22 is provided with two axially spaced radially-extending, internal, circular partition walls. A relatively thin upper wall 32 and a relatively thick lower wall 34, which together with the outer wall of the body 22 define a metering chamber for dispensing a metered quantity of liquid from the container 26. The upper and lower walls each have a central circular opening which can be selectively opened and closed by a valve arrangement to be described in more detail hereinafter.

The wall of the lower portion of the body 22 is thickened and provided with an annular recess 36 in the axial end thereof sized to receive the locating guide cylinder 12 of the shuttle 2 and so align the shuttle with the dispenser. The external surface of the thickened portion of the body 22 is provided with second means for cooperating a pair of shaped guide slots which includes to receive respective dogs 8 of the shuttle 2 after the cylinder 12 of the shuttle engages the recess 36.

The guide slots 38 are located on diametrically opposite sides of the body 22. Each slot 38 has an initial axially extending portion, followed by a circumferentially extending portion subtending substantially over an angle of 15°, followed by an angled portion extending both circumferentially and axially and subtending over an angle of 75°, followed by a circumferentially extending position and ending in an axially extending portion extending in the opposite direction to the first mentioned axially extending portion.

The body 22 contains a valve assembly comprising an elongate slide or shaft 40 having a drive recess DR. The shaft 40 carries an annular piston 42 which slidably engages the central opening in the lower relatively thick portion wall 34. The piston 42 has a circumferentially extending groove accommodating an O-ring 44 to provide a running seal between the piston 42 and the opening. At its upper end and located within the dispensing chamber, the piston carries a valve in the form of a disc 46 of larger diameter than the opening in the partition wall 34 so as to limit the downward displacement of the piston 42. The disc 46 carries an annular seal 43 on its underside to sealingly engage with the partition wall 34 when the piston 42 is in its lower position.

The lower partition wall 34 supports an inverted cup shaped cage 48 which extends over the opening the lower partition wall 34. At its upper end, the cage 48 has an opening through which the shaft 40 extends. The cage 48 is provided with a plurality of apertures or openings through which liquid can readily pass.

Towards its lower end portion, the cage 48 carries a pair of diametrically opposite radially inwardly directed stops 50 (see FIG. 8). The disc 46, which has a diameter smaller than the spacing between the stops 50, also carries a pair of diametrically opposite radially outwardly extending projections 52 which extend so that the spacing between their extremities is greater than the spacing between the stops 50. Thus with the shaft 40 in the angular position shown in FIG. 5 and with the disc 46 in sealing engagement with the lower partition wall 34, the projections 52 are aligned with respective stops 50 and lie between the stops 50 and the lower partition wall. Axial displacement of the shaft 40 in a direction to lift the seal 43 off the lower partition wall 43 is thus restricted. If the shaft 42 is then rotated so that the projections 52 are no longer aligned with the stops 50 (see FIG. 8A), the shaft 40 can then be displaced to open the valve or disc 46.

The gap between the stops 50 and the lower partition wall 34 is slightly greater than the thickness of the projections 52 so as to allow the projections 52 to pass relatively freely between the wall 34 and the stops 50 when the shaft 40 is rotated, however this limited amount of play should not enable the contents of the dispensing chamber to escape.

At its upper end, the shaft 40 has a central bore 54 which slidably supports the shank 56 of a valve 58. The valve 58 carries a sealing pad which can sealing engage the area of the upper partition wall 32 around the opening so as to close the opening. The bore 54 contains a coil spring (not shown) to urge the shank 56 upwardly but means (not shown) are provided to limit the upward movement of the shank 56 relative to the shaft 40 so that with the shaft 40 in the lowermost position shown in FIG. 5, the sealing pad of the valve 58 lies spaced from the opening. A cup shaped member 60 is supported on the underside of the lower partition 34 to define a drip collection chamber. The shaft 40 carries at its lower extremity a bulbous head 62 which when the shaft 40 is in its lowermost position abuts the region surrounding an opening in the lower end of the cup shaped member 60. The relative profiles of the engaging portions of the head 62 and the cup shaped member 60 are shown in greater detail in FIG. 6. As can be seen, the head forms a frusto-conical plug for the frusto-conical opening in the cup shaped member 60. The distal ends of the plug and opening are tapered in thickness to allow a degree of relative flexure and so ensure a tight seal to the drip collection chamber.

A tubular air vent 64 extends from the drip collection chamber and through the two partition walls 32 and 34 to an air vent chamber 66 mounted on the upper surface of the partition wall 32. An air vent opening in the upper partition wall 32 provides access to the air vent chamber 66. The air vent chamber 66 accommodates valve 68 which is constrained for slidable movement in the valve chamber 66 towards and away from the air vent opening. A coil spring (not shown) normally urges the air vent valve 68 to close. The valve 68 has a shaft 69 which projects through the air vent opening downwardly into the dispensing chamber.

At its upper end, the piston 40 carries a radially extending annular flange 70 which is of such diameter that when the shaft 40 is displaced upwardly, it will engage the shaft 69 and lift the valve 68 off its seat to vent the dispensing chamber to the drip collection chamber.

The bulbous head 62 has recess 72 in the lower end thereof of complementary shape to the upper end of the key 14 of the shuttle.

The operation of the dispensing system will now be described, with reference to FIGS. 7 to 12B. The A and B suffix of each figure shows the relative positions of the projections 52 and stops 50 defining the anti-lift device of the system and the relative positions of the dogs 8 and slots 38 of the dispensing system.

Thus, as shown in FIGS. 7 to 7B with the shaft 40 in its lower position, the openings in the lower partition wall 34 and the cup shaped drip collection chambers are closed, the air vent valve 68 is closed and the opening in the upper partition wall 32 is open. As a result, liquid in the liquid concentrate container flows 26 to fill the liquid metering chamber.

In this position, the angular orientation of the shaft 40 is such that the projections 52 are aligned with the stops 50 (see FIG. 7A) and so any unauthorised attempt to displace the piston 40 from below is prevented.

In this state, the shuttle 2 is offered up to the dispenser to cause the cylindrical portion 12 to engage the annular recess 36 of the dispenser and so axially align the shuttle with the dispenser. The shuttle 2 is then rotated to cause the dogs 8 to become aligned with the leading axially extending portions of their respective slots 38. Up to this point, the key 14 which engages the bulbous head 62 of the shaft 40 will prevent, the dogs from entering the slots 38. If now profile of the upper end of the key 14 matches and is aligned with the profile of the recess 72 in the bulbous head it will enter the recess and so allow the dogs to fully engage their respective slots.

When the dogs 8 reach the limit of the axially extending portion of the slots 38, the shuttle 2 will be allowed to rotate through an angle of 15° since the dogs 8 are now constrained to travel along the circumferentially extending portion of the slots 38 (see FIG. 8B). Rotation of the shuttle 2 will rotate the key 14 which in turn will rotate the shaft 40. Rotation of the shaft 40 will drive the projections 52 out of alignment with the stops 50 (see FIG. 8A). The shaft 40 is now unlocked for axial displacement.

Figure 9:
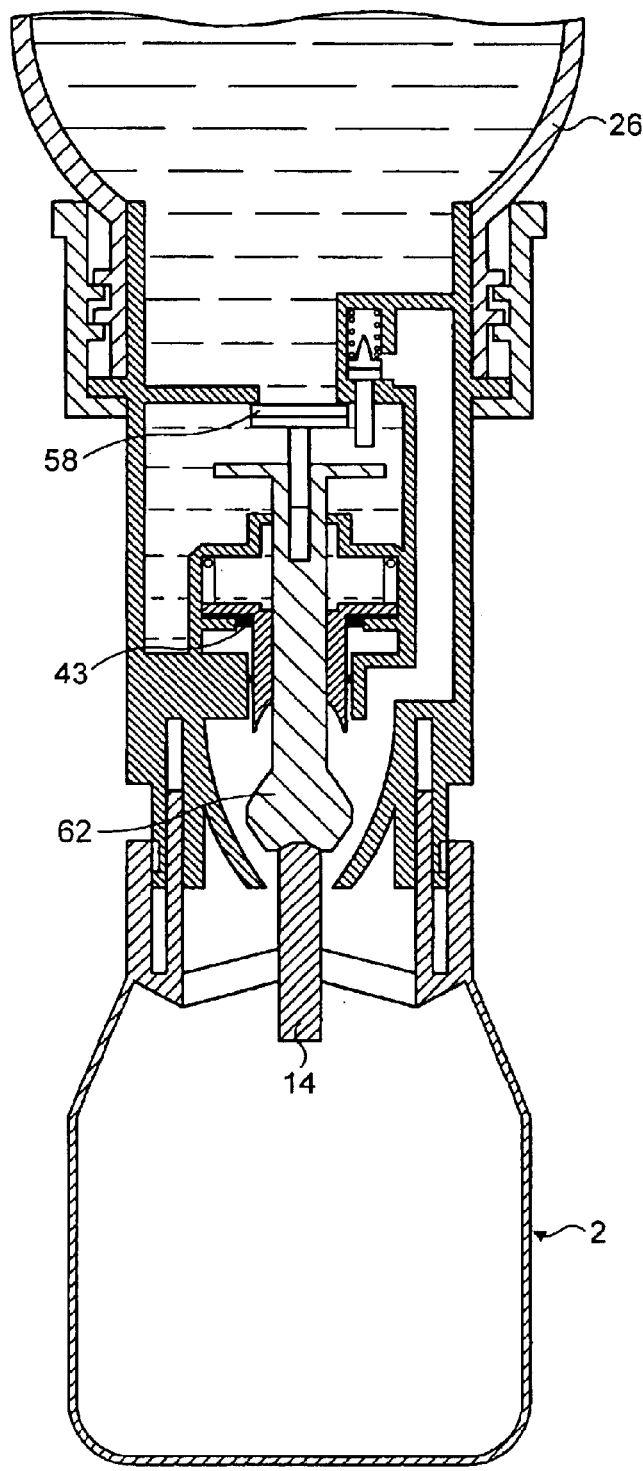
FIG. 9 is a longitudinal section through the dispenser system of FIG. 7 during the third stage of engagement.
Figure 9A:
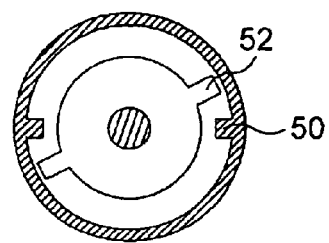
FIGS. 9A and 9B illustrate the positions of the anti-lift lock and the guide respectively during the third stage of engagement.
Figure 9B:
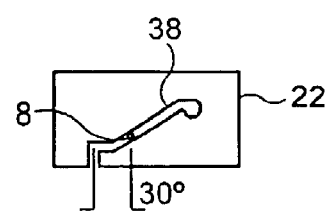
Figure 10:
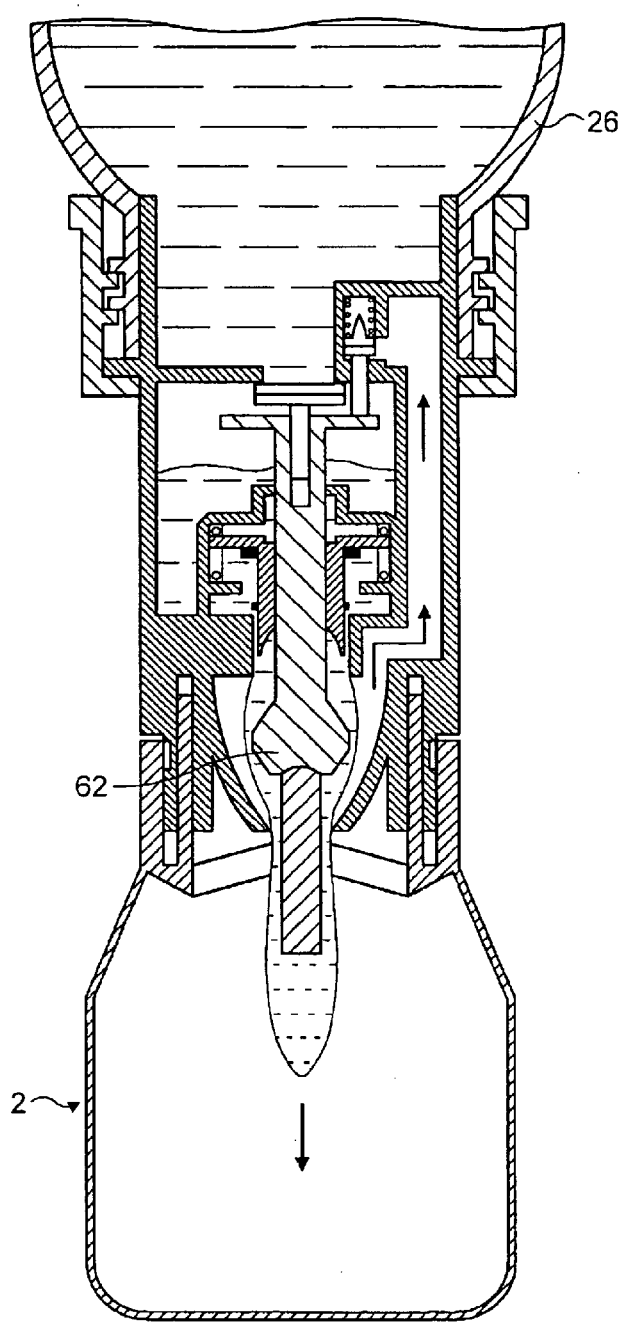
FIG. 10 is a longitudinal section through the dispenser system of FIG. 7 during the fourth stage of engagement.
Figure 10A:
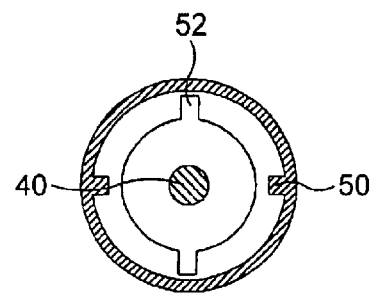
FIGS. 10A and 10B illustrate the positions of the anti-lift lock and the guide respectively during the fourth stage of engagement.
Figure 10B:
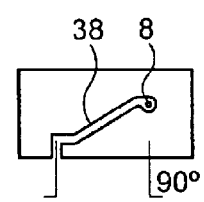
Figure 11:
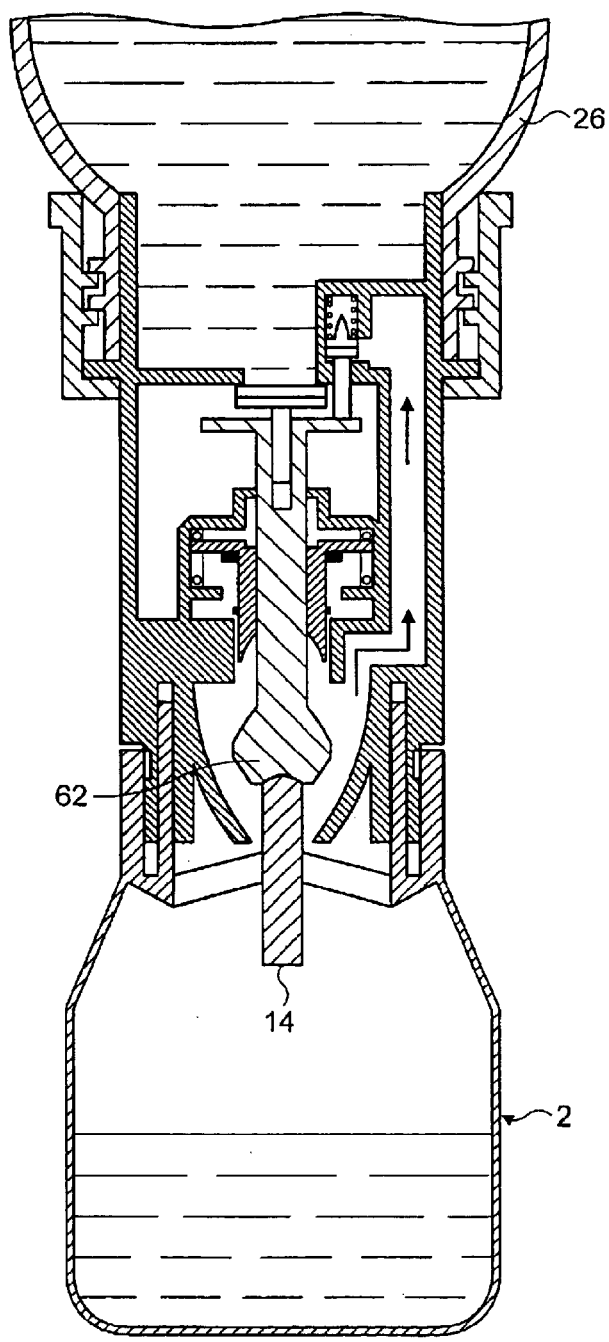
FIG. 11 is a longitudinal section through the dispenser system of FIG. 7 during the fifth stage of engagement.
Figure 11A:
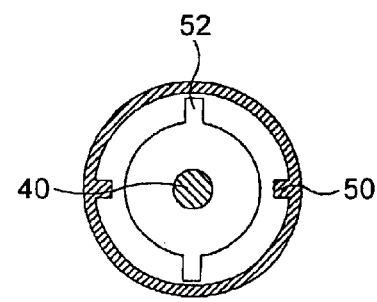
FIGS. 11A and 11B illustrate the positions of the anti-lift lock of the guide respectively along the fifth stage of engagement.
Figure 11B:
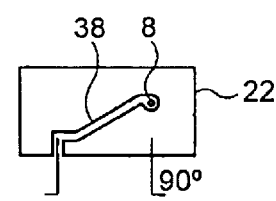

Further rotation of the shuttle through an angle of 15° will drive the dogs 8 along the angled portion of the slots 38 (see FIG. 9B) which will cause the key to drive the shaft 40 axially to open the drip collection chamber to break the primary seal 43 and to lift the valve 58 into engagement with the upper partition wall 32 so as to close off the metering chamber from the further ingress of liquid (see FIG. 9). Continued rotation of the shuttle along the inclined portion of the guide slots 38 to reach an angle of 90° will displace the piston 40 to cause the secondary running seal 44 to clear the opening in the lower partition wall and cause the annular flange 70 to open the air vent valve 68 (see FIG. 10).

Release of upward pressure on the shuttle will cause the dogs 8 to drop into the final vertically downwardly extending portion of the slots 38 to retain the shuttle in this position. Liquid will now flow down from the metering chamber through the drip collection chamber to discharge into the shuttle. The air vent tube will release any tendency of a vacuum to form at the upper end of the dispensing chamber.

When the discharge has been completed (see FIG. 11), the shuttle is pushed back towards the dispenser and rotated in reverse during which operation the air vent valve 68 will first close, the secondary seal 44 will reengage the opening followed by the opening of the valve 58 and then the engagement of the bulbous head 62 and the primary seal 46 with their respective openings and finally the valve 58 will disengage the opening and the upper partition wall 32 to allow the metering chamber to refill with liquid.

It will be appreciated that while the dispenser system has been described as dispensing liquids, it can equally be used to dispense solids in power or particulate form.

In a modification, instead of the mating end portions of the key and recess being axially aligned with the axes of the shaft and the shuttle container 12, they can be axially offset from the axis of the shaft and be of circular configuration.

While the anti-lift mechanism is shown located within the dispensing chamber, it can, of course, lie outside and/or take on a different configuration.

It will be appreciated that shuttle container 2 for holding different liquids will have their mating keys and recesses differently configured so that the liquid of the present dispenser cannot be inadvertently dispensed into such other shuttle containers. The shuttle container 2 may be appropriately coded eg by colouring to ensure that it matches with similar coding on its corresponding dispenser, so as to indicate that the dispenser will only dispense liquid to shuttle containers having a similar coding.

What is claimed is:

1. A fluid dispensing system comprising a dispenser attachable to a fluid reservoir to dispense metered quantities of fluid therefrom and a shuttle container which can be coupled to the dispenser to receive a metered quantity of fluid therefrom, the dispenser including a body defining a metering chamber having an inlet and an outlet, a valve assembly comprising an elongate slide carrying a first valve for opening and closing said outlet and a second valve for opening and closing said inlet, one said valve being resiliently retractable relative to the slide so that when the slide is longitudinally displaced from a first position to a second position, the second valve closes said inlet before the first valve opens said outlet and when the slide is longitudinally displaced from the second position to the first, the first valve closes said outlet before the second valve opens said inlet, the shuttle container having an annular wide neck for engagement with the body of the dispenser and a key for engaging the elongate slide to displace said slide from the first position to the second position, one of the engaging ends of the key having a mating projection and one of the engaging ends of the slide having a drive recess and the other having a mating projection which when said mating projection is engaged in said drive recess locks the two against a relative rotation locking means inhibiting displacement of the slide from the first position to the second position when the slide is in a first angular orientation and allowing said displacement when the slide is in a second angular orientation, means for cooperating said dispenser body with said annular wide neck, wherein second means for cooperating located on said dispenser body and first means for cooperating located on said annular wide neck engage each other only when said mating projection engages said drive recess, said first and second means for cooperating when engaged constraining relative movement between said shuttle container and the dispenser so as first to allow the key to rotate said slide from the first angular orientation to the second angular orientation to release said locking means and thereafter displace the slide from the first position to the second position both in response to manipulation of the shuttle container relative to the dispenser, whereby to discharge the metered quantity of fluid from the dispenser into the shuttle container.

2. A system according to claim 1, wherein said locking means comprises a projection extending radially from said slide and a stop rigid with said body located in the path of said projection when said slide is in said first angular orientation to prevent displacement of said slide from the first to the second position.

3. A system according to claim 2, wherein both said step and said projection are located within said metering chamber.

4. A system according to claim 1, wherein said shuttle container includes a guide cylinder disposed inwardly of the annular wide neck for engaging a cylindrical slot in the body to axially align the shuttle container with the body before the recess and mating projection engage one another.

5. A system according to claim 1, wherein the drive recess and mating projection are of non-circular configuration.

6. A system according to claim 5, wherein said drive recess and mating projection are of polygonal configuration.

7. A system according to claim 1, wherein said body includes a drip collection chamber downstream of said outlet, the drip collection chamber having a discharge orifice which is sealed by a bulbous portion of said slide when in said first position and opened when said slide is displaced to said second position.

8. A system according to claim 7, including a vent conduit connecting said drip collection chamber to the upper end of said metering chamber, a valve in said conduit biased to close, and means responsive to the slide moving from the first to the second position to open the valve to vent said metering chamber.

* * * * *